US008183990B2

(12) United States Patent
Gila et al.

(10) Patent No.: US 8,183,990 B2
(45) Date of Patent: May 22, 2012

(54) METHOD, TIRE SENSOR DEVICE, CENTRAL CONTROL UNIT AND SYSTEM FOR ANTI-THEFT PROTECTION THROUGH TIRE REMOVAL RECOGNITION

(75) Inventors: Janos Gila, Mödling (AT); Alfred Pohl, Mistelbach (AT); Robert Tschofen, Vienna (AT); Johannes Österreicher, Perchtoldsdorf (AT)

(73) Assignee: Continental Automotive GmbH, Hannover (DE)

( * ) Notice: Subject to any disclaimer, the term of this patent is extended or adjusted under 35 U.S.C. 154(b) by 797 days.

(21) Appl. No.: 12/240,155

(22) Filed: Sep. 29, 2008

(65) Prior Publication Data

US 2009/0085732 A1 Apr. 2, 2009

(30) Foreign Application Priority Data

Sep. 28, 2007 (DE) ........................ 10 2007 046 494

(51) Int. Cl.
*B60R 25/10* (2006.01)
*G08B 21/00* (2006.01)

(52) U.S. Cl. ............ 340/426.33; 340/426.1; 340/539.1; 340/686.1; 340/686.2; 340/686.6

(58) Field of Classification Search ........................ None
See application file for complete search history.

(56) References Cited

U.S. PATENT DOCUMENTS

| | | | | |
|---|---|---|---|---|
| 5,552,759 | A * | 9/1996 | Stoyka | 340/426.33 |
| 5,699,685 | A * | 12/1997 | Jahrsetz et al. | 70/264 |
| 2003/0095039 | A1 * | 5/2003 | Shimomura et al. | 340/426.1 |
| 2003/0193398 | A1 | 10/2003 | Geber et al. | |
| 2003/0206102 | A1 * | 11/2003 | Joao | 340/539.1 |
| 2004/0056763 | A1 * | 3/2004 | Fischer et al. | 340/426.1 |
| 2004/0090344 | A1 * | 5/2004 | Caretta et al. | 340/870.07 |
| 2005/0007235 | A1 * | 1/2005 | Stasi | 340/5.72 |
| 2006/0109092 | A1 * | 5/2006 | Yoshiyuki | 340/426.33 |
| 2007/0171030 | A1 * | 7/2007 | Kobayashi | 340/426.1 |
| 2008/0094191 | A1 * | 4/2008 | Grickscheit et al. | 340/426.34 |
| 2009/0284357 | A1 * | 11/2009 | Ortega et al. | 340/425.5 |

FOREIGN PATENT DOCUMENTS

| | | | |
|---|---|---|---|
| DE | 10209766 | B4 | 2/2004 |
| DE | 102004043336 | A1 | 4/2006 |

* cited by examiner

*Primary Examiner* — Julie Lieu
(74) *Attorney, Agent, or Firm* — Laurence A. Greenberg; Werner H. Stemer; Ralph E. Locher

(57) ABSTRACT

A method for recognizing the removal of a tire provided with a tire sensor device, includes recognizing, with the tire sensor device, if a respective tire is mounted on the motor vehicle and storing an item of information relating to a mounting status in the tire sensor device. If a removal is determined, the tire sensor device sends an item of information characterizing the removal to a central control unit and the central control unit outputs a warning. A tire sensor device, a central control unit and a system for anti-theft protection through tire removal recognition, are also provided.

14 Claims, 2 Drawing Sheets

METHOD, TIRE SENSOR DEVICE, CENTRAL CONTROL UNIT AND SYSTEM FOR ANTI-THEFT PROTECTION THROUGH TIRE REMOVAL RECOGNITION

CROSS-REFERENCE TO RELATED APPLICATIONS

This application claims the priority, under 35 U.S.C. §119, of German Patent Application DE 10 2007 046 494.2, filed Sep. 28, 2007; the prior application is herewith incorporated by reference in its entirety.

BACKGROUND OF THE INVENTION

Field of the Invention

The invention relates to a method, a tire sensor device, a central control unit and a system for removal recognition of a tire provided with a tire sensor device, in which the tire sensor device recognizes whether or not a respective tire is mounted on a motor vehicle and in which an item of information relating to a mounting status is stored in the tire sensor device.

In practice, it is problematic that tires, for instance more expensive car tires, but also tires on trucks, are being stolen time and time again as a result of their, to some extent, considerably high value. In this application, tires refer in brief to the complete wheel system, formed of a wheel rim, a tire casing, a valve and a tire sensor device.

It is thus necessary to quickly learn of a theft in order to prevent the completion thereof, at least to be informed of the theft as quickly as possible and to reduce the consequences thereof.

SUMMARY OF THE INVENTION

It is accordingly an object of the present invention to provide a method, a tire sensor device, a central control unit and a system for anti-theft protection through tire removal recognition, which overcome the hereinafore-mentioned disadvantages of the heretofore-known methods and devices of this general type and which promptly provide an alert in the case of a theft of a tire.

With the foregoing and other objects in view there is provided, in accordance with the invention, a method for recognizing a removal of a tire from a motor vehicle. The method comprises providing the tire with a tire sensor device, recognizing, with the tire sensor device, if a respective tire is mounted on the motor vehicle, storing an item of information relating to a mounting status of the tire in the tire sensor device, transmitting an item of information characterizing a removal of the tire, from the tire sensor device to a central control unit, upon determining a removal of the tire and outputting a warning with the central control unit.

In accordance with another mode of the invention, an imminent removal is announced to the central control unit. This is particularly advantageous in the case of body shops or in the event of a breakdown, in which a tire has to be changed and in the process removed beforehand.

In accordance with a further mode of the invention, it is particularly expedient for the central control unit to output an alarm, if a removal signal is received from the tire sensor device, without the central control unit having been notified beforehand of an imminent and thus planned removal.

In accordance with an added mode of the invention, the central control unit is able to outwardly convey an alarm message by way of an electronic data transmission system, for instance, once it has received the information relating to the removal, without an imminent removal having been notified. As a result it is possible to very promptly inform the fleet management of a trucking company and it is also possible for the theft to be immediately reported to the police.

In accordance with an additional mode of the invention, it is also expedient if the user of the motor vehicle, in other words the driver, for instance, is able to manually switch off the alarm or alarm message of the central control unit in order to prevent an alarm from being triggered in the event of a merely accidental non-warning of a scheduled removal. This is then particularly advantageous if the alarm message is announced externally, by way of an electronic data transmission system for instance, since in these cases, intensive actions are frequently triggered which can thus still be stopped in time.

In accordance with yet another mode of the invention, in order to minimize conceivable misuse, it is also favorable for a code to have to be entered in order for the user to manually, or in any other way, switch off the alarm signal, with it being most expedient for misuse prevention if this code has to be entered within a predetermined time period.

In accordance with yet a further mode of the invention, the tire sensor device, once it has sent an alarm to the central control unit, receives a response from the central control unit. If the tire sensor device receives and processes a result of an evaluation of the central control unit—theft or planned removal—the tire sensor device can also execute further method steps, which depend on the result of the evaluation of the central control unit.

In accordance with yet an added mode of the invention, it is thus possible, for instance, to allow the tire sensor device to emit higher power radio signals at specific intervals, in order to facilitate a positioning, for instance through the use of radio bearing. Provided the tire sensor device can determine its position itself, for instance with the aid of an integrated satellite navigation system, the tire sensor device can also immediately transmit the position specification, thereby facilitating a positioning and thus a location.

With the objects of the invention in view, there is also provided a tire sensor device for a tire. The tire sensor device comprises a recognition device for determining if a respective tire is mounted on a vehicle, a memory for storing an item of information relating to a mounting status of the tire on the vehicle, and a transmitter for transmitting an item of information characterizing a removal of the tire from the vehicle.

With the objects of the invention in view, there is furthermore provided a central control unit for recognizing removal of a tire associated with a motor vehicle. The central control unit comprises a receiver, and a device for outputting a warning message as soon as the central control unit has received information relating to the removal of the tire, without notice having been given of an imminent removal.

With the objects of the invention in view, there is concomitantly provided a system for recognizing removal of a tire. The system comprises a tire sensor device according to the invention and a central control unit according to the invention.

Other features which are considered as characteristic for the invention are set forth in the appended claims.

Although the invention is illustrated and described herein as embodied in a method, a tire sensor device, a central control unit and a system for anti-theft protection through tire removal recognition, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

BRIEF DESCRIPTION OF THE SEVERAL DRAWING

DETAILED DESCRIPTION OF THE INVENTION

Figure 1:
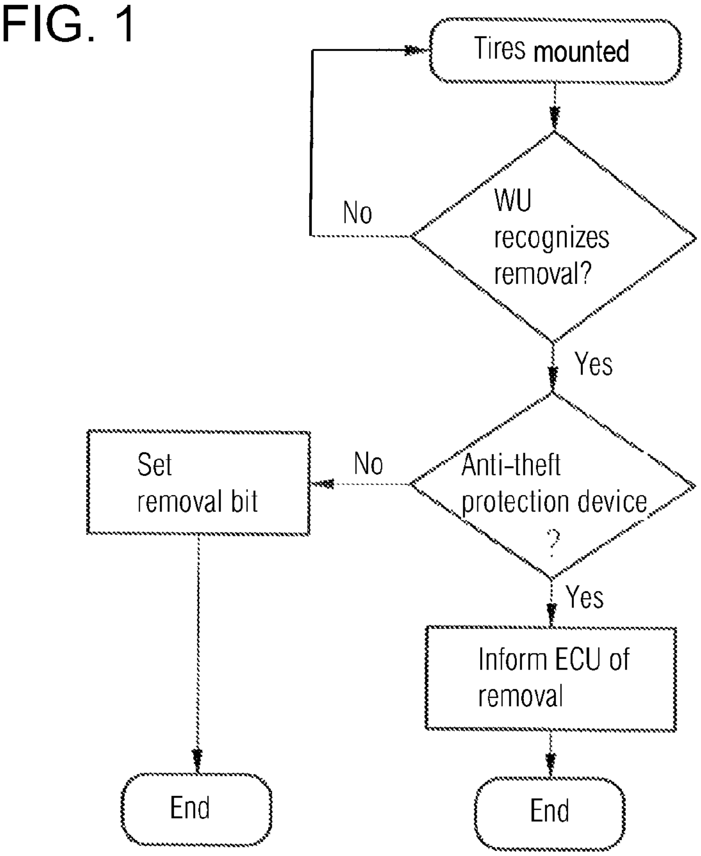
FIG. 1 is a flow chart showing a procedure carried out by a method according to the invention in a tire sensor device WU.

Referring now to the figures of the drawings in detail and first, particularly, to FIG. 1 thereof, there is seen a procedure carried out by a method in a tire sensor device WU for one exemplary embodiment of the invention. In the case of a mounted tire, a status "tire mounted" is firstly stored. Provided no special action is determined, this status remains in the memory.

If, by contrast, the system recognizes a removal of the tire, a check is then carried out next to determine whether or not an anti-theft protection device is implemented in the system. It is only when an anti-theft protection device of this type is implemented that it makes sense to further notify a central control unit ECU of a removal, which otherwise could not do anything with this information.

If no anti-theft protection device is implemented, a bit in the tire sensor device WU is set, which allows it to recognize that a tire has been removed. Further measures are not triggered. Many kinds of procedures are conceivable for the removal recognition process. By way of example, the tire could be coupled to a respective axle through the use of an electronic circuit configuration, so that the circuit is closed, for instance, if the tire is removed.

If, on the other hand, an anti-theft protection device is implemented, the tire sensor device WU sends a signal to the central control unit ECU and notifies it of the removal.

Figure 2:
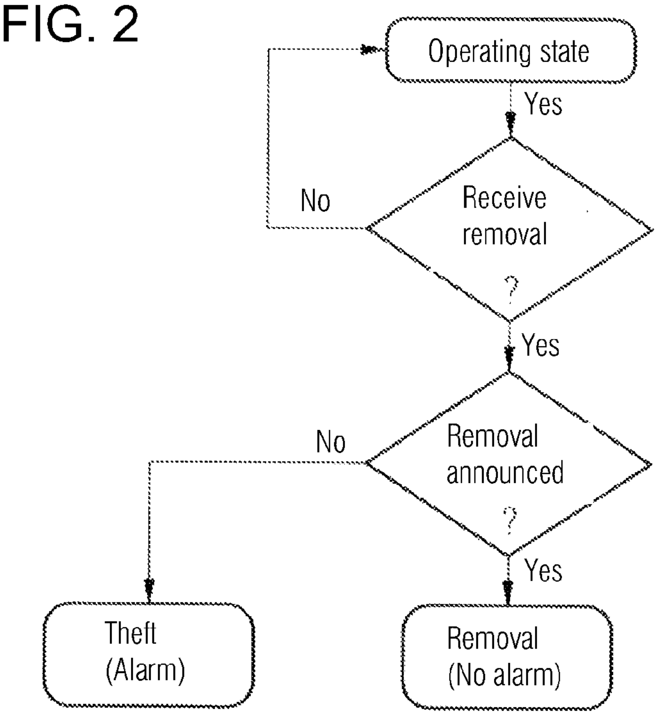
FIG. 2 is a flow chart showing a procedure carried out by a method according to the invention in a central control unit ECU.

FIG. 2 shows how the central control unit ECU handles this information. The central control unit ECU is firstly in a normal operating mode, in which it also remains, provided it does not receive a removal signal from the tire sensor device WU.

If a removal signal is received, a check is carried out to determine whether or not the central control unit ECU was notified in advance of a removal. If this is the case, the system identifies that the removal has now taken place. Information relating to the tires, which was previously assigned to the central control unit ECU, is deleted.

If no removal was announced, an alarm handling routine is initiated.

In this case the alarm handling can, in the simplest case, be an acoustic and/or an optical warning message to the driver, with it also being possible to forward the message through a radio transceiver to a driver located in the vicinity. It is, however, also conceivable for conventional alarm signals, like flashing lights and sounding horns, to be triggered. Such a warning output device is identified by reference numeral 3 in FIG. 3.

In a further embodiment of the method, a warning message is sent out by way of a mobile radio device or an Internet message, for instance, through the device 3.

It is, however, also possible to link the alarm message to an electronic data transmission system and for a central control unit to have been notified of the removal of the tire which has taken place without notice of prior removal having been given, for instance in a service station or by a driver.

This gives rise to further possibilities in terms of troubleshooting, since the electronic data transmission control center can then either immediately forward the alarm and, for instance, start a search for the tire sensor device WU and thus for the tire, inform the police or also call the driver of the motor vehicle or get into contact with him/her in any other fashion. It is thus possible to initially question the driver as to whether or not an impermissible operating instance, namely a theft, actually exists or instead only a planned tire removal, following a breakdown for instance.

A query of this type is also expedient in the event of a theft, since the driver is frequently able to communicate additional information relating to his/her position and possibly also relating to the theft or the offender(s) themselves.

In a further embodiment according to the invention, the tire sensor has a transmitter which, in the event of a removal that is not announced, transmits signals over a specific time frame so that it can be located more easily. As a result, it is possible to more rapidly provide information about a theft and to regain possession of the tire.

It is particularly advantageous if the tire sensor device has or can determine information relating to its own position. The information can, however, also be transmitted through the central control unit ECU to the tire sensor, with it being advantageous if this transmission is not constant but is instead carried out for instance only after a certain predefined wait time, for instance 15 minutes. In this case, it is possible to transmit this immediately and thus to accelerate the location and thus the information as to the theft.

Figure 3:
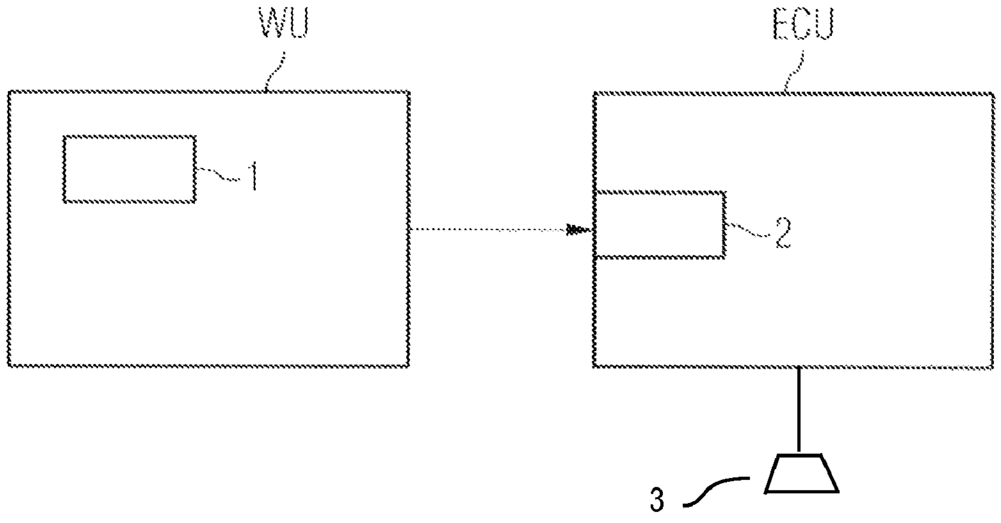
FIG. 3 is a block diagram showing a tire sensor device and a central control unit.

FIG. 3 shows a tire sensor device WU, which includes a memory 1 for storing an item of information relating to the mounting status of a tire. The tire sensor device WU also includes a transmitter for transmitting an item of information characterizing the removal. This information characterizing the removal is typically transmitted from the tire sensor device WU to a central control unit ECU, which has a corresponding receiver 2. The central control unit ECU has the output device 3 mentioned above which outputs a warning message once it has received the information relating to a removal, without notice having been given of an imminent removal. The central control unit ECU is usually disposed on the vehicle side.

The invention claimed is:

1. A method for recognizing a removal of a tire from a motor vehicle, the method comprising the following steps:

providing the tire with a tire sensor device;

recognizing, with the tire sensor device, if a respective tire is mounted on the motor vehicle;

storing an item of information relating to a mounting status of the tire in the tire sensor device;

transmitting an item of information characterizing a removal of the tire, from the tire sensor device to a central control unit, upon determining a removal of the tire;

outputting a warning with the central control unit; and announcing an imminent removal of the tire to the central control unit.

2. The method according to claim 1, which further comprises outputting the warning from the central control unit as soon as it has received the item of information characterizing a removal of the tire, without notice having been given of an imminent removal of the tire from the vehicle.

3. The method according to claim 1, which further comprises transmitting an alarm message from the central control unit by way of an electronic data transmission system, as soon as it has received the item of information characterizing a removal of the tire, without notice having been given of an imminent removal of the tire from the vehicle.

4. The method according to claim 1, which further comprises manually deactivating the warning of the central control unit by a user of the motor vehicle.

5. The method according to claim 3, which further comprises manually deactivating the alarm of the central control unit by a user of the motor vehicle.

6. The method according to claim 5, which further comprises entering a code by the user to stop the alarm message.

7. The method according to claim 6, wherein the code characterizes the user and is only known to the user.

8. The method according to claim 6, wherein the user has to enter the code within a predetermined time period.

9. The method according to claim 3, wherein the tire sensor device, once it has sent an alarm to the central control unit, receives a response from the central control unit and the central control unit communicates a result of an evaluation.

10. The method according to claim 1, wherein the tire sensor device emits higher power radio signals at specific intervals to facilitate a positioning, if the central control unit has given notice of the removal of the tire from the vehicle.

11. The method according to claim 10, which further comprises facilitating the positioning by using a radio bearing.

12. The method according to claim 10, wherein the tire sensor device transmits radio signals at specific intervals, containing a position of the tire sensor device, if the central control unit has given notice of the removal of the tire from the vehicle.

13. A central control unit for recognizing removal of a tire associated with a motor vehicle, the central control unit comprising:

a receiver; and a device for outputting a warning message as soon as the central control unit has received information relating to the removal of the tire, dependent upon whether notice has been given of an imminent removal of the tire from the vehicle.

14. A system for recognizing removal of a tire, the system comprising:

a tire sensor device including a recognition device for determining if a respective tire is mounted on a vehicle, the tire sensor device including a memory for storing an item of information relating to a mounting status of the tire on the vehicle, and the tire sensor device including transmitter for transmitting an item of information characterizing a removal of the tire from the vehicle;

a central control unit for recognizing removal of a tire associated with a motor vehicle, the central control unit including a receiver, and a device for outputting a warning message as soon as the central control unit has received information relating to the removal of the tire, dependent upon whether notice has been given of an imminent removal of the tire from the vehicle.

* * * * *